United States Patent [19]
Crawford

[11] Patent Number: 5,117,885
[45] Date of Patent: Jun. 2, 1992

[54] HEAVY DUTY CASTER WITH REPLACEABLE TIRE

[75] Inventor: Thomas A. Crawford, Jackson, Mich.
[73] Assignee: Unique Industries, Inc., Jackson, Mich.
[21] Appl. No.: 564,572
[22] Filed: Aug. 9, 1990
[51] Int. Cl.⁵ .......................... B60C 7/24; B60B 21/02
[52] U.S. Cl. .................................... 152/323; 152/382; 301/63 DS
[58] Field of Search ............ 152/246, 323, 375, 379.3, 152/379.5, 382; 301/63 DS, 105 R, 105 S, 65, 86

[56] References Cited

U.S. PATENT DOCUMENTS

| | | |
|---|---|---|
| Re. 16,161 | 9/1925 | Talley . |
| 603,726 | 5/1898 | Cudey ................... 152/323 |
| 674,577 | 5/1901 | Fowl ................... 301/63 DS |
| 960,460 | 6/1910 | Watters ................... 152/323 |
| 1,141,585 | 6/1915 | Schleicher ................... 152/375 |
| 1,397,171 | 11/1921 | Millet . |
| 1,500,113 | 7/1924 | Dade ................... 301/86 |
| 1,501,743 | 7/1924 | Bowen ................... 301/63 DS |
| 1,518,369 | 12/1924 | Stolp . |
| 1,989,189 | 1/1935 | Frank ................... 301/63 DS |
| 2,152,684 | 4/1939 | Grange et al. ................... 301/5.3 |
| 2,723,415 | 11/1955 | Taylor et al. ................... 16/45 |
| 2,943,889 | 7/1960 | Woldring et al. ................... 301/63 |
| 3,382,009 | 5/1968 | Hawley et al. ................... 301/63 DS |
| 3,895,668 | 7/1975 | Tangorra ................... 152/379 |
| 4,561,481 | 12/1985 | Kawauchi et al. ................... 152/379.5 |
| 4,783,880 | 11/1988 | Chapman et al. ................... 301/63 D |

FOREIGN PATENT DOCUMENTS

| | | | |
|---|---|---|---|
| 0633178 | 1/1928 | France ................... 152/382 |
| 1063132 | 4/1954 | France ................... 152/323 |
| 0505804 | 12/1954 | Italy ................... 152/323 |
| 0008826 | of 1893 | United Kingdom ................... 152/382 |

Primary Examiner—Geoffrey L. Knable
Assistant Examiner—Nancy T. Krawczyk
Attorney, Agent, or Firm—Beaman & Beaman

[57] ABSTRACT

A caster wheel consisting of a pair of one-piece hub portions adapted to be releasably secured together to support a polyurethane tire and permit replacement thereof. The inner portion of the tire is trapped in a cavity which permits the tire to expand, or flow, axially under load bearing conditions. The tire's side walls are supported by a pair of outwardly divergently disposed support surfaces which substantially engage the entire length of the side walls to form a solid radial column of tire support and incorporate radial projections to prohibit relative rotation between the tire and the hub portions.

2 Claims, 1 Drawing Sheet

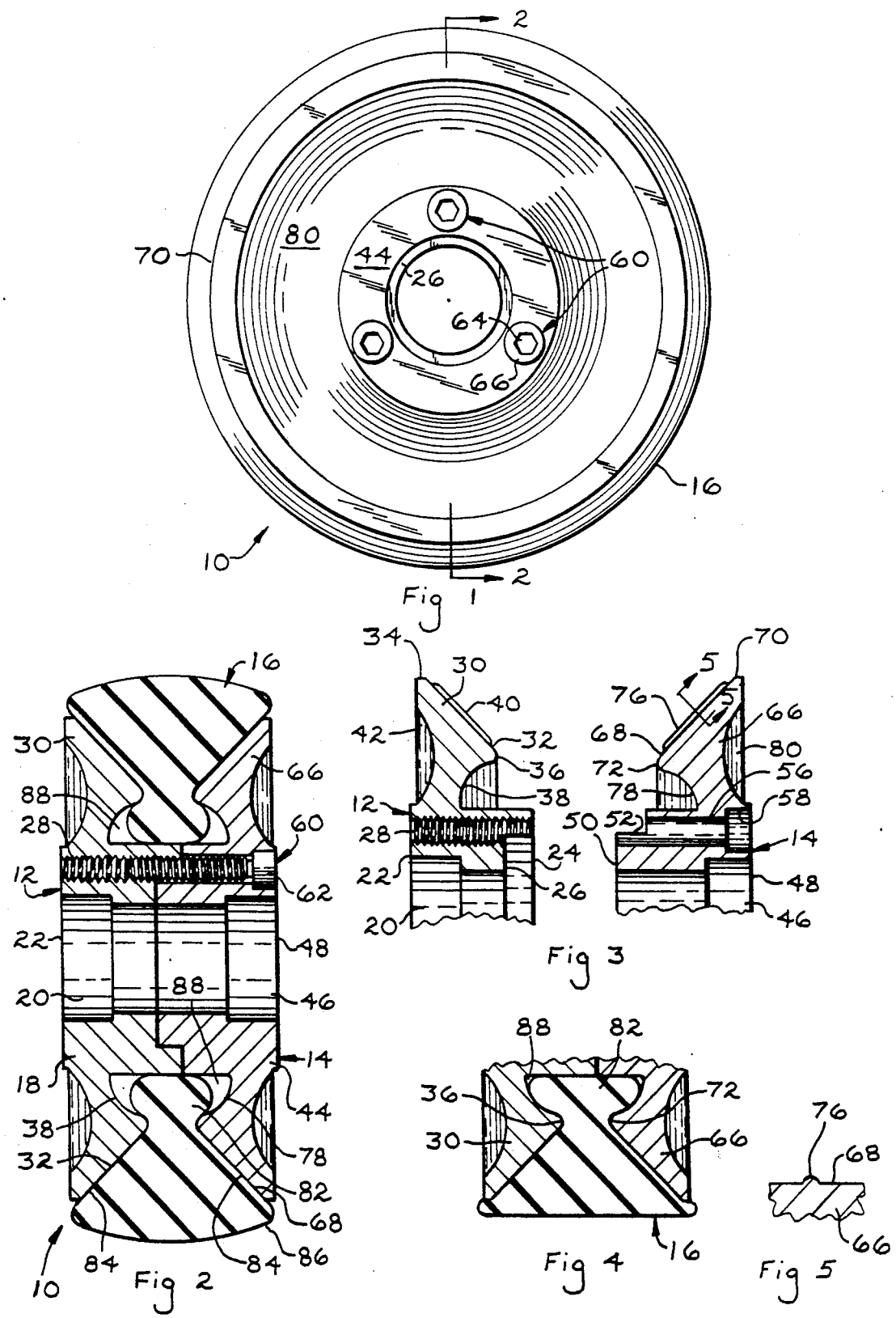

HEAVY DUTY CASTER WITH REPLACEABLE TIRE

BACKGROUND OF THE INVENTION

Caster wheels typically consist of a hub portion circumferentially encircled by a tire formed of rubber, polyurethane or other similar type material supported thereon. Casters are known having a pair of interconnected hub portions wherein each hub portion is provided with an annular rim or flange of a configuration adapted to oppose one another to form an annular recess or cavity for radially receiving the tire's inner radius portion. The tire's inner radius portion may be in the form of a pre-existing annular bead having a configuration complementary to that of the recess to form a tight fit therewith as shown in U.S. Pat. No. 3,895,668. Or, the inner radius may be deformed into a precise fit with the recess upon clamping the hub portions together as typified in U.S. Pat. No. 2,152,684.

While the aforementioned patents have achieved some degree of success a number of deficiencies in the constructions still exist. For instance, the construction in U.S. Pat. No. 2,152,684 does not permit the hub portions to be disassembled and reassembled to replace a worn tire. While U.S. Pat. No. 3,895,668 does permit the tire to be replaced, the construction utilizes a pneumatic tire and is of relatively low structural strength unsuitable for heavy duty applications.

Another deficiency with caster wheels of the aforedescribed type is that the recess does not permit the tire's inner radius portion to expand under load bearing conditions and, consequently, the outer radius portion of the tire compresses in an undesirable manner tending to cause the tire to wear unevenly and the caster wheel to roll inefficiently. Also, the known constructions do not includes tire support surfaces which support the entire length of the tire's side walls to form a solid radial column or incorporate projections to increase the frictional forces between the tire and the hub portions to prohibit rotation between the same.

It is an object of the invention to provide a caster wheel having a polyurethane tire having hub portions wherein the hub portions permit the tire to expand, or flow, under low bearing conditions to control the deformation of the tire.

Another object of the invention is to provide a caster wheel having a tire including an annular bead adjacent the inner diameter thereof radially supported within a dovetail cavity defined between hub portions wherein the cavity is of a larger axial dimension than the bead, thereby, permitting the bead and the adjacent portion of the tire to flow axially under load bearing conditions to together with hub portion sidewalls form a strong annular column having improved performance qualities.

A further object of the invention is to provide a caster wheel wherein one-piece hub portions are provided with support surfaces adapted to support substantially the entire length of the tire's side walls.

Yet a further object of the invention is to provide a caster wheel wherein the hub support surfaces are provided with a plurality of ribs to increase the friction between the tire and the hub portions and prohibit rotation between the same.

Still a further object of the invention is to provide a caster wheel which uses a simple construction, permits quick and easy replacement of the tire, and is useable for heavy duty applications.

Another object of the invention is to provide a caster wheel which is reliable in operation and is relatively inexpensive to manufacture.

In the practice of the invention a pair of complementary shaped one-piece hub portions each include a cylindrical segment having an axial passage extending therethrough between outer and inner ends and a radial flange. The hub portions, inner ends are adapted to be releasably clamped together by Allen bolts whereby the flanges oppose one another in space relation to radially support a tire. The tire is formed of a resilient material such as rubber or polyurethane and includes an annular bead adjacent the inner diameter thereof and a pair of spaced side walls radially extending from the bead.

The opposed flanges are of such configuration as to form an annular dove tail recess or cavity adapted to radially receive the tire's annular bead. The flanges also form a pair of outwardly divergently disposed tire support surfaces which radially extend from an opening adjacent the dove tail cavity to support substantially the entire length of the tire's side walls. A plurality of projections in the form of radially extending ridges or ribs are defined on the support surfaces to increase the friction between the tire and the hub portions to prohibit relative rotation therebetween.

The cavity is of a larger axial dimension than the axial dimension of the tire's bead which permits the inner radius portion of the tire to flow axially under load bearing conditions to accommodate for the compression forces imposed on the tire's outer radius portion whereby the tire's side walls are compressed radially inwardly into a frictional engagement with the support surfaces and the associated projections. This flowing controls the deformation of the tire, provides improved performance qualities in the caster wheel, and maintains the tire on the hub. Also, the life of the tire is prolonged as the tire tends to wear evenly.

Preferably, the hub portions are fabricated by a forging process to form a rugged construction suitable for heavy duty applications. Also, the caster wheel incorporates a simple construction which permits the tire to be quickly and conveniently replaced, when necessary, without the necessity of special tools or machines.

BRIEF DESCRIPTION OF THE DRAWINGS

The aforementioned objects and advantages of the invention will be appreciated from the following description and accompanying drawings wherein:

FIG. 1 is a side elevational view of a caster wheel constructed in accord with the invention in a non-load bearing condition, FIG. 2 is an elevational, sectional view as taken along Section 2—2 of FIG. 1, FIG. 3 is a partial, elevational view of the hub portions prior to assembly, FIG. 4 is a partial, elevational sectional view of the hub portions, cavity, and the tire in the assembled condition illustrating the tire under a high load bearing condition, and FIG. 5 is an enlarged, detail, elevational, sectional view as taken along Section 5—5 of FIG. 3 illustrating one of the radial ridges.

DESCRIPTION OF THE PREFERRED EMBODIMENT

With reference to the drawings, a caster wheel constructed in accord with the inventive concepts is generally indicated at 10. The caster wheel 10 includes a pair of complementary shaped one-piece hub portions 12 and 14 which are adapted to be releasably clamped to one another to radially support a tire 16 and, when necessary, permit replacement thereof.

Preferably, the hub portions 12 and 14 are fabricated by a forging process to provide a high strength construction suitable for heavy duty applications. However, the hub portions 12 and 14 could also be formed by other high strength processes such as by casting or machining. The hub portion 12 includes a cylindrical segment 18 having an axially extending passage 20 intersecting an outer end 22 and an inner end 24. The passage 20 is provided with an annular counter sunk socket axially defined by radial stop surface 26 adjacent the inner end 24, and a plurality of circumferentially spaced threaded bores 28 extend through the segment 18.

Exteriorly, the hub portion 12 is provided with a radial flange 30 which homogeneously extends from the segment 18 and includes a tapered surface 32. The surface 32 extends from a largest diameter, adjacent an outer edge 34, to a smallest diameter in the direction of the inner end 24, terminating at edge 36. An annular recess 38 is defined on the flange 30 adjacent the edge 36 and the outer surface of the segment 18. The tapered surface 32 defines a tire supporting surface and is provided with a plurality of projections in the form of radially extending and circumferentially spaced ridges or ribs 40. FIG. 3. The flange 30 is also provided with an annular weight reducing recess 42.

The hub portion 14 includes a cylindrical segment 44 having an axially extending passage 46 intersecting an outer end 48 and an inner radial end 50. The hub portion 14 is provided with an annular axial extension defining step 52 adjacent the inner end 50 adapted to be inserted in the socket at the inner end 24 of the hub portion 12. The segment 44 is also provided with a plurality of circumferentially spaced bores 56 extending therethrough between the ends 48 and 50, and each bore is counter bored at 58. The bores 56 align with the threaded bores 28 of the hub portion 12 to receive an Allen bolt 60 having a head 62. The head 62 is adapted to be received in the counter bore 58 and is provided with a polygonal shaped opening 64, FIG. 1, for receiving a complementary shaped Allen wrench, not shown.

Exteriorly, the hub portion 14 is provided with an annular flange 66 which is a mirror image of the flange 30 when the hub portions 12 and 14 are connected at the inner ends 24 and 50. The flange 66 includes a tapered surface 68 extending from a largest diameter adjacent an outer edge 70 to a smallest diameter in the direction of the inner end 50, terminating at edge 72. The surface 68 defines a tire supporting surface and is provided with a plurality of projections in the form of radially extending and circumferentially spaced ridges or ribs 76, FIGS. 3 and 5. An annular recess 78 is defined on the flange 66 adjacent the edge 72 and the outer surface of the segment 44. The flange 66 is also provided with an annular recess 80.

The tire 16 is formed of a resilient material such as rubber or polyurethane and is shown in its original non-load bearing shape in FIGS. 1 and 2. The tire comprises an annular bead 82 adjacent the inner diameter thereof and a pair of outwardly divergently disposed side walls 84 which radially extend from the bead 82 and terminate at the periphery 86.

To assemble, the tire 16 is located intermediate and aligned with the inner ends 24 and 50 of the hub portions 12 and 14, respectively, and the end 50 is fully inserted in the socket in the end 24 whereby the radial end 50 engages the stop surface 26. The threaded bores 28 are aligned with the bores 56 by rotating the hub portions relative to one another, and Allen bolts 60 are received in the aligned bores and threadedly tightened by an Allen wrench, not shown, to complete the assembly of the caster wheel 10.

When assembled, the recesses 38 and 78 form an annular dove tail cavity 88, FIGS. 2 and 4, in which the tire's bead 82 is radially received, and the support surfaces 32 and 68 are outwardly divergently disposed to one another. The edges 36 and 72 define a throat opening adjacent the cavity 88 of a dimension less than the normal axial dimension of the tire's bead 82 to maintain the bead within the cavity 88 and permit the tire's side walls 84 to engage the tire support surfaces 32 and 68. The passages 20 and 46 align to receive bearings, not shown, about which the caster wheel 10 rotates.

In the non-load bearing condition, the tire 16 maintains its original shape whereby the dimension of the cavity 88 is axially larger than that of the bead 82 and the inner diameter of the tire contacts the base of the cavity 88 as appreciated in FIG. 2. Upon the caster wheel 10 being subjected to a load bearing condition, whereby compression forces are imposed on the lower outer radius portion of the tire, the cavity 88 permits the bead 82 and the adjacent inner radius portion of the tire to expand, or "flow," axially, as illustrated in FIG. 4. This flowing controls the deformation of the tire 16 to provide improved performance qualities in the caster wheel, increase the "grip" of the cavity 88 on the bead 82, and prolongs the life of the tire. As noted in FIG. 4, under compression the unsupported portion of the tire is minimized giving the caster high stability even under high loads.

For instance, a strong solid radial column is formed as the caster wheel 16 rolls which provides additional strength for radially supporting the tire. Further, instead of the tire's outer circumference adjacent the edge 86 compressing in an undesirable manner, the controlled "flowing" of the tire permits the tire to be compressed radially inwardly such that the support surfaces 68 and 32 support substantially the entire length of the tire's side walls 84. This permits the caster wheel to roll more efficiently and the tire to wear evenly. Also, the engagement of the ridges 40 and 76 with the tire's side walls 84 increases the frictional forces between the tire and the hub portion to prohibit rotation between the same and, thereby, further reduce tire wear.

As the surfaces 32 and 68 are at approximately 45° a direct application of forces in a radial direction directly imposes radial forces from the tire to the hub portions due to the high coefficient of friction between these surfaces and the tire and this angle combined with the low compressibility of the tire permits the caster to handle high radial forces since the forged constructions of the hubs 12 and 14 prevent ready deformation of the hubs.

When necessary, the construction of the caster wheel 10 permits the tire to be quickly and easily replaced without the necessity of special tools or bonding processes. This is accomplished simply by removing the Allen bolts 60 and separating the hub portions and the tire whereby a new tire may be quickly installed in the described manner. The construction is relatively inexpensive to manufacture, yet is of high structural strength for heavy duty applications.

It is appreciated that various modifications to the inventive concepts may be apparent to those skilled in the art without departing from the spirit and scope of the invention.

I claim:

1. A heavyduty caster wheel comprising, in combination, a pair of rigid complementary shaped metal one-piece hub portions formed by the process of the class of casting, forging and machining each having a cylindrical segment portion having an axis, a cylindrical bearing receiving recess concentric to said axis, an outer end, an inner end, and a radial flange, a tire support surface defined on each radial flange disposed at approximately 45° to the associated hub portion axis, radial alignment interlocking means defined on said inner ends comprising an axial extension defined on one inner end and an axial socket defined on the other inner end receiving said extension, axially extending bolts interposed between said hub portions for releasably clamping said hub portions' inner ends' interlocking means together whereby said flanges axially oppose one another, opposed recesses defined on said opposed flanges defining an annular cavity having an opening radially outwardly thereof and opposed spaced tire bead support surfaces, said bolts being radially located between said axis and said cavity, said tire support surfaces being divergent and having a length extending radially outwardly from adjacent said opening, and a resilient deformable solid tire having an annular inner bead adjacent the inner diameter thereof said inner diameter of said solid tire contacting an inner diameter of said cavity, and a pair of divergent side walls radially extending from said bead, said bead being received in said cavity and said side walls engaging said tire support surfaces, said cavity having a volume substantially larger than the volume of the original shape of said tire bead thereby permitting said bead and the adjacent portion of said tire to flow into said cavity upon said tire being deformed under compression forces to define a solid radial column of tire support.

2. In a caster wheel as in claim 1, a plurality of convex ribs defined on said tire support surfaces adapted to frictionally engage said tire side walls.

* * * * *